United States Patent
Drelinger

(10) Patent No.: US 7,568,451 B2
(45) Date of Patent: *Aug. 4, 2009

(54) ROTARY NAIL FILING APPARATUS FOR ANIMALS

(76) Inventor: Jay Drelinger, 1515 Marseille Pl., Dallas, TX (US) 75204

( * ) Notice: Subject to any disclaimer, the term of this patent is extended or adjusted under 35 U.S.C. 154(b) by 0 days.

This patent is subject to a terminal disclaimer.

(21) Appl. No.: 12/194,533

(22) Filed: Aug. 19, 2008

(65) Prior Publication Data

US 2009/0056732 A1 Mar. 5, 2009

Related U.S. Application Data

(63) Continuation of application No. 11/259,332, filed on Oct. 25, 2005, now Pat. No. 7,428,881.

(51) Int. Cl.
*A01K 13/00* (2006.01)
*A45D 29/00* (2006.01)
*A45D 29/18* (2006.01)
*B24B 23/00* (2006.01)
*B24B 27/08* (2006.01)

(52) U.S. Cl. ............ 119/610; 451/358; 451/454; 132/73; 132/73.6; 132/75.8; 132/76.4; 119/608

(58) Field of Classification Search ........... 30/26–29; 132/73–75.8, 76.4; D30/158; 119/608–610, 119/600, 601; 451/358, 453, 457, 241, 451, 451/349, 454, 545, 45, 58, 65

See application file for complete search history.

(56) References Cited

U.S. PATENT DOCUMENTS

| | | | |
|---|---|---|---|
| 2,056,379 A | 10/1936 | Acocella | |
| 3,754,556 A | 8/1973 | Watkins | |
| 3,845,553 A | 11/1974 | Fields | |
| 4,117,854 A | 10/1978 | Rosenbloom | |
| 4,213,471 A | 7/1980 | Burian | |
| 4,228,585 A | 10/1980 | Nelson | |
| 4,449,297 A | 5/1984 | Fuchs | |
| 4,753,253 A | 6/1988 | Hutson | |
| 4,854,334 A | 8/1989 | Su | |
| 4,896,684 A | 1/1990 | Chou | |
| 5,123,430 A | 6/1992 | Davidovitz | |
| 5,459,926 A | 10/1995 | Perea | |
| 5,488,997 A | 2/1996 | Yamada | |
| 5,533,262 A | 7/1996 | Clark | |

(Continued)

FOREIGN PATENT DOCUMENTS

DE 3151588 7/1983

(Continued)

*Primary Examiner*—Andrea M Valenti
(74) *Attorney, Agent, or Firm*—Scott T. Griggs; Griggs Bergen LLP

(57) ABSTRACT

A rotary nail filing apparatus for animals is described that includes a shroud or housing, an opening in the shroud that is suitable sized and shaped to allow an end portion of an animal's nail to be put through the opening, and a suitably shaped and oriented rotary grinder that is contained within the shroud grinding at least a portion of an animal's nail when put through the opening, where at least a portion of the nail particles that are grinded away by the rotary grinder are contained in a portion of the shroud. In some embodiments, the rotary grinder position/orientation and/or its surface are adjustable and/or replaceable.

1 Claim, 15 Drawing Sheets

U.S. PATENT DOCUMENTS

| | | | |
|---|---|---|---|
| 5,819,757 A | 10/1998 | Baekkelund | |
| 5,887,598 A | 3/1999 | Oliver | |
| 6,138,360 A | 10/2000 | Owens, Sr. | |
| 6,332,431 B1 | 12/2001 | Brown | |
| 6,523,546 B2 | 2/2003 | Jo | |
| 6,865,812 B1 | 3/2005 | Martin, Jr. | |
| 2003/0229989 A1 | 12/2003 | Yusufov | |
| 2004/0123465 A1 | 7/2004 | Kuzuu | |
| 2004/0134505 A1 | 7/2004 | Kuzuu | |
| 2006/0042559 A1 | 3/2006 | Kang | |
| 2006/0150992 A1 | 7/2006 | Nevakshonoff | |

FOREIGN PATENT DOCUMENTS

| | | |
|---|---|---|
| EP | 0526386 | 2/1993 |
| GB | 2191396 | 12/1987 |
| GB | 2415132 | 12/2005 |

ROTARY NAIL FILING APPARATUS FOR ANIMALS

CROSS-REFERENCE TO RELATED APPLICATIONS

The present patent application is a continuation of, and claims priority benefit to, the U.S. nonprovisional patent application having Ser. No. 11/259,332 and filed on Oct. 25, 2005 now U.S. Pat. No. 7,428,881 under 35 U.S.C. 120, which is hereby incorporated by reference for all purposes.

FEDERALLY SPONSORED RESEARCH OR DEVELOPMENT

Not applicable.

REFERENCE TO SEQUENCE LISTING, A TABLE, OR A COMPUTER LISTING APPENDIX

Not applicable.

FIELD OF THE INVENTION

The present invention relates generally to pet grooming products. More particularly, the invention relates to a method to safely trim an animal's nails without damaging the vein inside the nail, known as the "quick".

BACKGROUND OF THE INVENTION

People who groom dogs and other clawed animals generally use a pair of scissors or a guillotine style nail clipper to trim animal claws. Scissors and animal nail clippers can be dangerous and painful to the animal if the user is not careful with the amount of claw removed. In every animal claw, there is a vein called the "quick" that lies within the nail bed. This vascular structure is not easily visible if the pigmentation of the nail is dark, as is the case in most dogs. The "quick" has very sensitive nerve endings and is prone to bleed profusely when cut. Cutting the "quick" will cause injury and negative conditioning for the animal and will make the future task of cutting the animal's nails more difficult.

Scissors and anvil style clippers pose a problem when clipping animal nails because the nail can often be crushed or splintered by an inaccurate angle of cut or dull clipper blades. The clipper also has a tendency to make the nail jagged and rough when cut. The animal nail is made of many layers and can be crushed by an inaccurate cutting angle, a dulled blade, or a loose hinge on the clipper.

FIG. 1 illustrates, by way of example, a "prior art" method of trimming a dog's nails using a rotary filing device 60. This drawing shows one of the few operational positions 62 that an animal handler can take when using the current style of rotary animal nail filing device. As FIG. 1 illustrates, the handler has little control over animal movement when the two are facing each other. The prior art illustrates another problem, there is only one angle of operation between the handler and the animal. This angle of operation does not allow control of the animal and may result in an injured nail or paw.

Some dog groomers have tried to use generic rotary tools, such as a Dremel tool, to grind an animal's nail to the desired length. However, high-speed rotary tools have a number of disadvantages when compared to the present invention. By way of example, there is no protective guard to keep the animal from encountering the free spinning grinding wheel. If a rotary tool with an exposed wheel is used to grind the nail of a longhaired dog, the animal's hair can get wound up in the tool, which is a major problem when working with wiggling dogs.

Other issues must be addressed if a rotary tool is to be used to file animal nails. If the direction of the grinding wheel spin is not considered when engaging the nail, the animal's claw will awkwardly skip and bump over the grinding wheel. This can increase fear and discomfort in the animal and adds a significant learning curve when training an animal to be accustomed to the tool.

Another problem with rotary tools is that the nail can fragment and throw nail debris outwardly. This will cause an unwanted mess, and may even lead to a possible eye injury. Still another problem with exposed grinding wheels is that the animal can see the high-speed rotating object and may become fearful and anxious. Problems such as these force many dog owners to have professional groomers perform this task at great expense.

Some conventional approaches attempt to change the style of the rotary tools so they can be used to file an animal's nails. However, these attempts fall short because they still have open face grinding wheels. This poses a problem with dogs because the dog's toes are webbed, making accidental contact on adjacent toes with the spinning wheel a likely situation. Another disadvantage to rotary filing tools is that a trigger must be depressed manually to operate the device. This gives the operator only one free working hand to manipulate the animal. A better solution is to mount the rotary filing tool on a horizontal or vertical surface so the operator can have both hands free to handle the animal.

Some disadvantages of current rotary filing tools include that they have no way to regulate the correct angle of operation, of 50 to 130 degrees, from the nail to the grinding wheel respectively. This angle is often important to obtain a properly shaped nail in many applications. Another disadvantage is that no attempt is made to visually obscure the spinning rotary bit and reduce animal anxiety. Yet another disadvantage is that prior art devices do not have interchangeable housings for different nail sizes and multiple grades of grinding wheels. The best rotary filing tool should have additional features that allow grinding of different types and sizes of animal nails and that can create different finishes on the nail.

BRIEF DESCRIPTION OF THE DRAWINGS

The present invention is illustrated by way of example, and not by way of limitation, in the figures of the accompanying drawings and in which like reference numerals refer to similar elements and in which.

Figure 1:
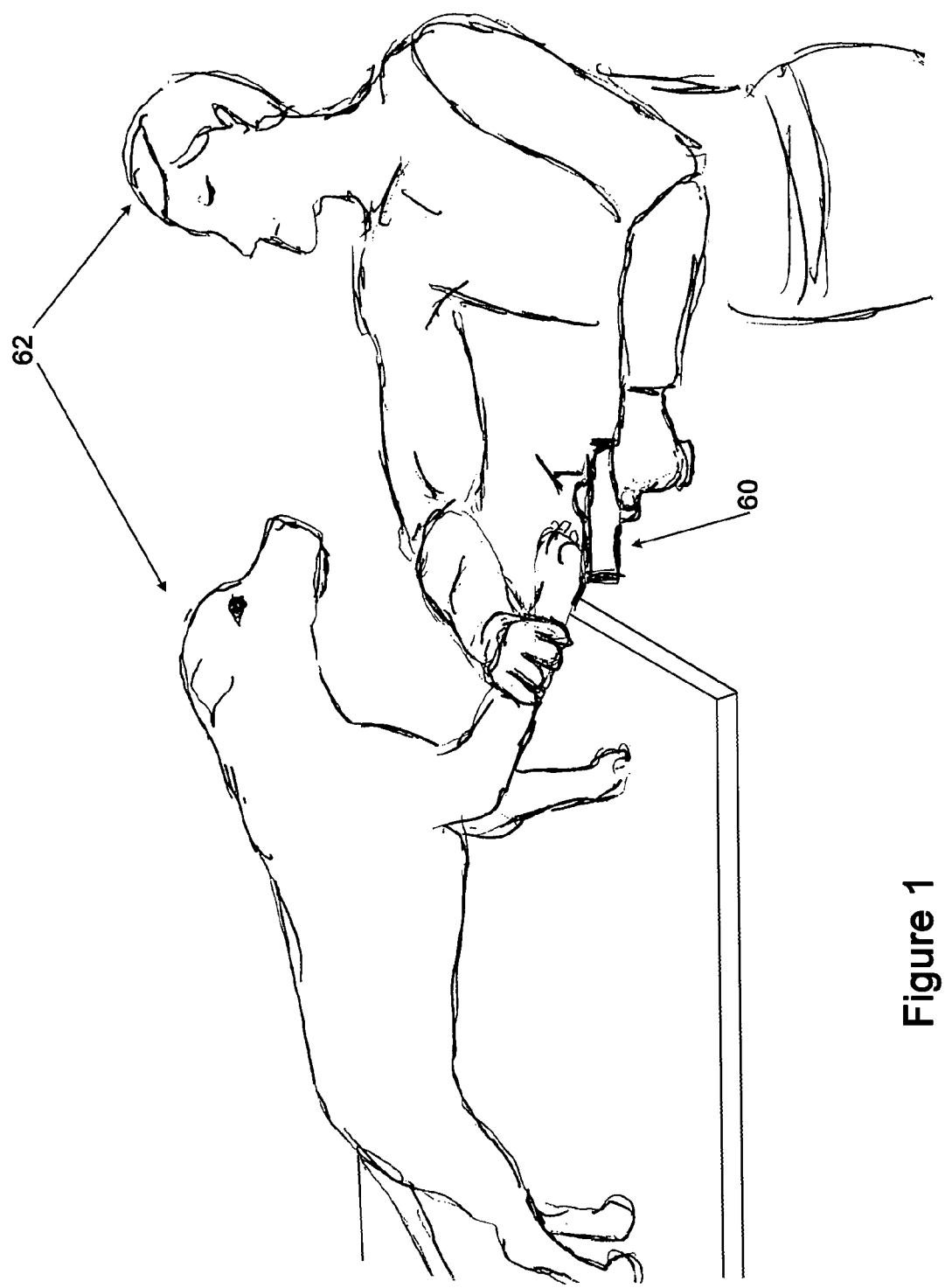
FIG. 1 illustrates a handler filing a dog's nails using a prior art rotary filing device.

Unless otherwise indicated illustrations in the figures are not necessarily drawn to scale.

SUMMARY OF THE INVENTION

To achieve the forgoing and other objects and in accordance with the purpose of the invention, a variety of devices for the filing of animal nails are described.

In a preferred embodiment of the present invention, a rotary nail filing apparatus for animals is described that includes a shroud or housing, an opening in the shroud that is suitable sized and shaped to allow an end portion of an animal's nail to be put through the opening, and a suitably shaped and oriented rotary grinder that is contained within the shroud grinding at least a portion of an animal's nail when put through the opening, where at least a portion of the nail particles that are grinded away by the rotary grinder are contained in a portion of the shroud. In some embodiments, the rotary grinder position/orientation and/or its surface are adjustable and/or replaceable.

In another embodiment of the present invention, a rotary nail filing apparatus for animals is provided that includes means for housing internal components of the rotary nail filing apparatus, means for enabling an end portion of an animal's nail to be enter into the housing means, means for grinding at least a portion of an animal's nail when entered into the housing means, and means for containing at least a portion of the nail particles that are grinded away by the nail grinding means. In some embodiments, the rotary nail filing apparatus further includes means for adjusting the grinding distance, angle, and/or grinding surface texture of the nail grinding means with respect to an animal's nail that is entered into the housing means. In other embodiments of the present invention, the rotary nail filing apparatus further includes means for guiding an end portion of an animal's nail to cooperate more effectively with the housing nail entering means.

Other features, advantages, and object of the present invention will become more apparent and be more readily understood from the following detailed description, which should be read in conjunction with the accompanying drawings.

DETAILED DESCRIPTION OF THE PREFERRED EMBODIMENTS

The present invention is best understood by reference to the detailed figures and description set forth herein.

Embodiments of the invention are discussed below with reference to the Figures. However, those skilled in the art will readily appreciate that the detailed description given herein with respect to these figures is for explanatory purposes as the invention extends beyond these limited embodiments.

One aspect of the present invention is to provide a method that allows for incremental filing of an animal's claw or nail that does not pinch or sever the sensitive nerves that are in the nail. The procedure is painless because the actual filing process mimics nature. When the nail is filed, the result is a smooth, rounded finish rather than a jagged and splintered edge. The present invention uses a rotary grinding wheel that does not need to he replaced often like clippers with blades that dull over time. The ability to interchange rotary tools that have different capabilities is a major advantage of the present invention.

Another aspect of the present invention is to provide a rotary tool housing that protects the animal from abrasion and from catching long hair in the rotating grinding wheel. In one embodiment the tool housing has an opening that directs the nail at the surface to the correct angle and position with respect to the filing surface. The tool housing embodiment catches and accumulates filed nail debris and makes the procedure safer and convenient to clean. The tool housing embodiment also protects adjacent toes on the animal and alleviates anxiety and fear in the animal by limiting the view of the rotating grinding wheel. Interchangeable housings can be designed for filing different sized nails and for different types of filing applications.

Another aspect of the present invention is that rotary filing tool embodiments are configurable to be clamped to a horizontal or vertical surface to allow the groomer more flexibility to handle the animal in different positions during the filing process. Such embodiments of the present invention enable the user to have both hands free and allows the handler to occupy many different positions with respect to the animal to be groomed. The present invention makes the groomers' job easier, more efficient and is cost effective when used at home.

Figure 2:
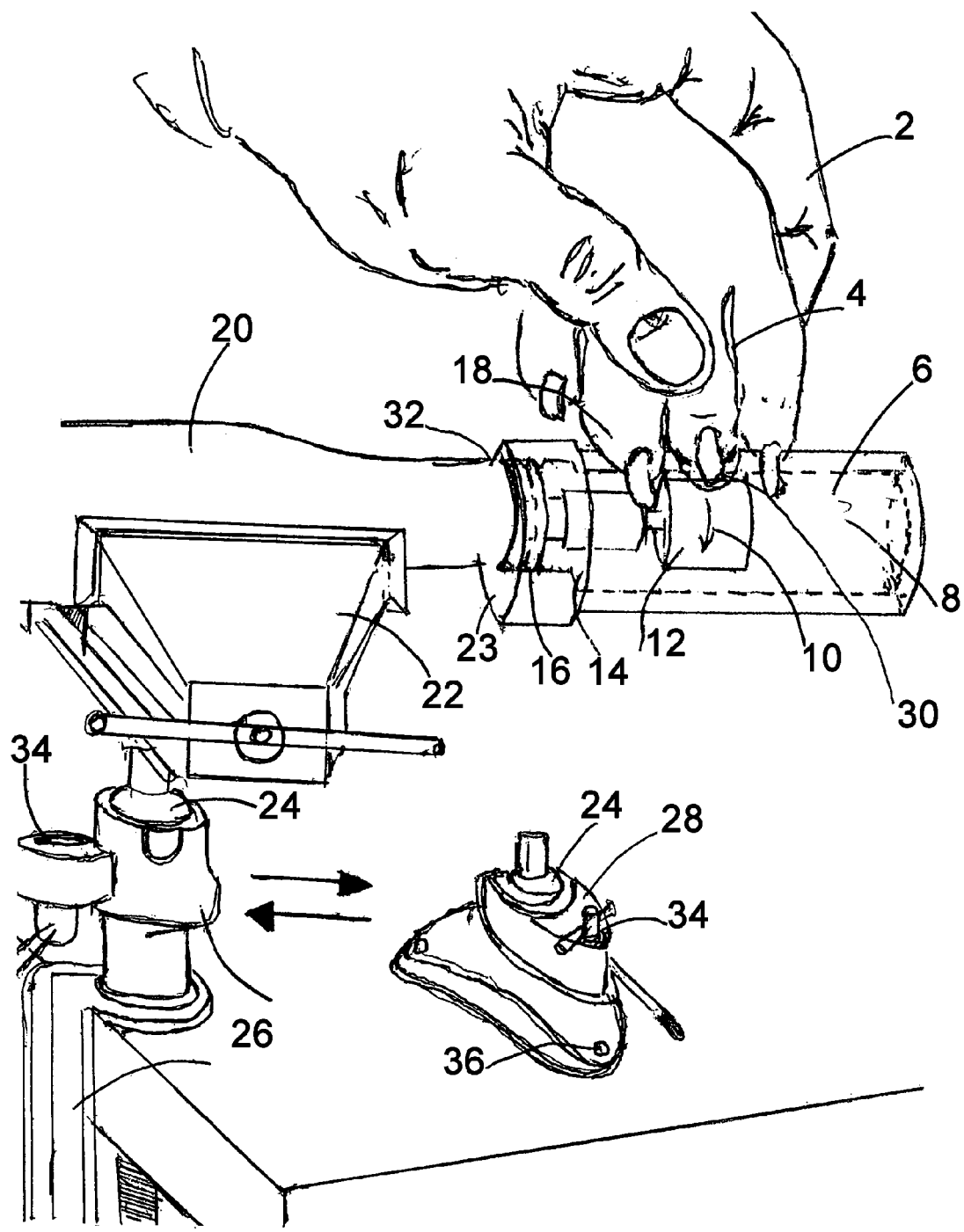
FIG. 2 illustrates, by way of example, a side perspective view of rotary nail file tool and exemplary use thereof, in accordance with an embodiment of the present invention.

FIG. 2 illustrates, by way of example, an exemplary rotary tool 20 and an exemplary method that an animal handler 2 can use when trimming an animal's nails. Animal handler 2 can position the claw at the appropriate angle and manipulate the animal's digit correctly. A housing 6 protects the animal's adjacent toes from abrasion, which housing is often helpful to protect the animal's toes as they usually have a web 4 and they tend to move while filing nails. Housing 6 also hides the view of the spinning rotary bit 12 and helps to keep the animal from becoming anxious. Housing 6 also protects longhaired animals from accidentally getting their hair caught in the grinding wheel. Housing 6 collects debris from filed nail particles and can be removed for cleaning by unscrewing housing 6 from rotary tool 20. Housing 6 may be connected to rotary tool 20 is by any suitable means such as, without limitation, the use of threads 16 as shown in the present example. By way of example, and not limitation, housing 6 could be connected to the rotary tool by a snap or clipping mechanism according to known means. The ability to separate the housing from the rotary tool allows relatively easy exchange of different housings to accommodate various animal nail sizes. Removal of housing 6 also permits the interchange of assorted grades of commercially available rotary bits that can range from smooth for buffing to very course for grinding.

In the present embodiment, there is an offset member 23 interposed between rotary tool 20 and housing 6 to appropriately align rotary bit 12 with housing 6. Offset member 23 assures that the relative distance between the animal's nail and rotary bit 12 at a contact point 30 is always the same. For applications that do not require this consistent offset distance feature, alternate embodiments may exclude offset member 23.

An inner portion 14 of housing 6 is preferably designed with an adequate spacing that permits rotary bit 12 enough clearance to spin freely in a constant direction (e.g., arrow 10) and allow room for nail debris 8 to be collected at the bottom of housing 6.

Rotary tool 20 and conjoined housing 6 may be mounted to a horizontal or vertical surface by any suitable means, including, without limitation, a clamping device 22. Mounting rotary tool 20 allows both hands of the operator to be free to hold and position the animal. Clamping device 22 allows the operator many useful angles of operation. For example, rotary tool 20 can pivot in a 180-degree circular direction by rotating bracket 24 to the desired position and then tightening locking mechanism 34. Other applications that do not require rotatable mounting means may, in alternate embodiments, implement rigid mounting means instead. The present device may configured to accommodate a desired range of table thickness by way of a screw clamp 26, for example, or other suitable means known to those skilled in the art. By way of further example, without limitation, screw clamp 26 can be interchanged with a vacuum base 28 for working on tables or other suitable surfaces. Vacuum base 28 has a position lock mechanism 34 and a rotating bracket 24 that permits 180-degree positioning. The vacuum base may, in some alternate embodiments, be permanently fixed to a surface by known means, for example, screws 36. Depending upon the needs of the particular application the clamping apparatus could be fixed in a multiplicity of known ways. For example, without limitation, the clamping apparatus could be fixed on the tool itself making a singular unit in various practical or aesthetic variations; e.g., a tool similar in appearance to a bench grinder. In applications requiring securing the present apparatus to a surface, conventional means including, without limitation, clamping, suction, gluing, and screw/bolting are contemplated.

Figure 3A:
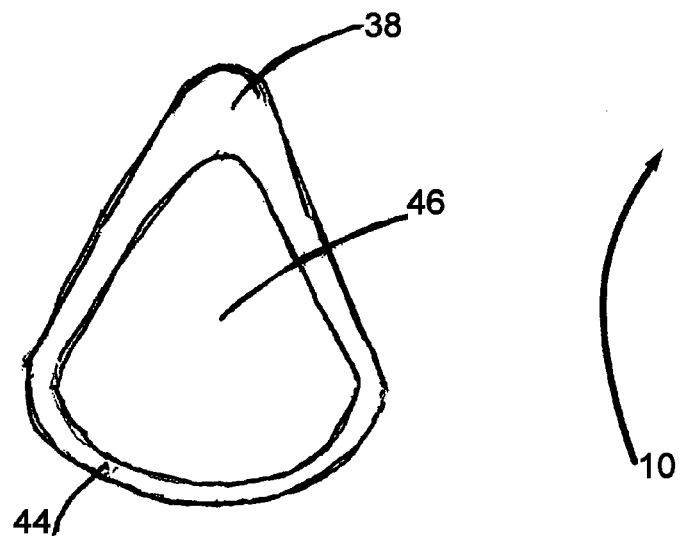
FIG. 3A illustrates a top view of an exemplary contact opening in an exemplary housing, in accordance with an embodiment of the present invention.
Figure 3B:
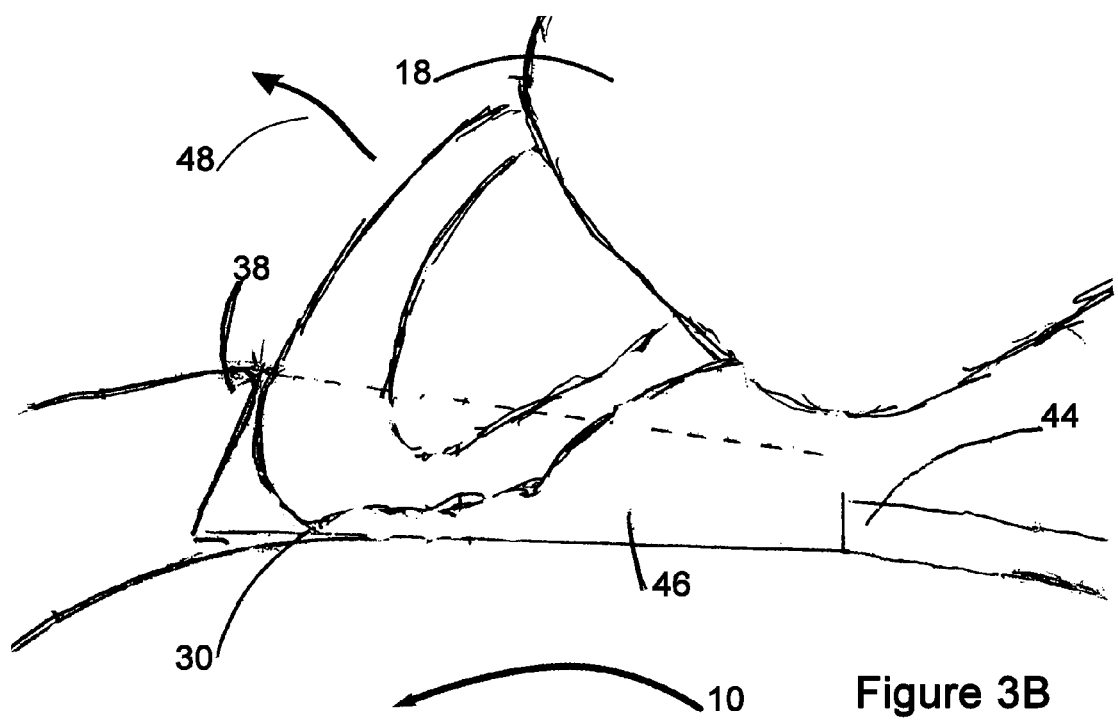
FIG. 3B illustrates a side view of an exemplary manner in which the contact opening guides the animal nail to a grinding wheel.

FIG. 3A illustrates an exemplary contact opening in an exemplary housing, in accordance with an embodiment of the present invention and FIG. 3B illustrates an exemplary manner in which the contact opening guides the animal nail to a grinding wheel. Shown in FIGS. 3A and 3B are a number of features in housing 6 that improve efficiency when filing an animal's nail. By way of example, nail guide opening 46 in housing 6 is designed with a triangular shape to assist in positioning nail 18 and to best fit the natural shape of the nail. As rotary bit 12 spins in direction 10, the directional force pulls nail 18 to the apex of the triangle into a holding point 38. The holding point 38 is angled at suitable angle (e.g., 75 degrees) to hold the nail in place without substantial slippage. The side opposite the triangle apex at holding point 38 is designed with a semi-circle edge 44 and a thin wall for visibility of a contact point 30. The thin semi-circle edge 44 allows the operator to see where nail 18 meets rotary bit 12. Nail 18 can be positioned at a suitable angle 48 (e.g., between 50 and 130 degrees in many applications), with respect to the horizontal surface of rotary bit 12, to obtain the desired shape of nail 18. A multiplicity of alternate configurations of the embodiment shown are contemplated depending upon the needs of the particular application. For example, possibly for further safety and exactness, in some embodiments of the present invention, the housing is made of a clear plastic to facilitate viewing of the nail engaging the contact point. In some embodiments of the present invention, the housing is configured with a paw placement bay. In other embodiments of the present invention, the grinding bit is configured to be moved mechanically and adjusted incrementally (e.g., by cm or mm) inside the housing to achieve a specific relationship between the housing and the bit (useful, for example, for determining the length of enamel to remove). In yet other embodiments of the present invention, the nail guide opening is constructed to be snapped or slid onto a permanent housing, possibly for ease in choosing a suitable size or style. In still other embodiments of the present invention, a cauterizing devise is included, located beneath the housing, for example. In some embodiments of the present invention, the angle of the grinding bit in relation to the rotary motor is made adjustable to any optimal or preferred angle. Embodiments of the present invention may further be configured with housings of adjustable shape; or an exact measuring system (e.g., cm or mm) and be made of a material of any suitable density grade of plastic or suitable metal, including, without limitation, lightweight aluminum. Those skilled in the art will readily recognize, in light of the present teachings, yet other configurations of the embodiment shown depending upon the needs of the particular application. For example, without limitation, in some application a motorized rotary grinder may not be desired, and a conventional manually powered rotary grinder may be used instead; e.g., without limitation, the handle could be configured with a squeezable trigger or lever that is pumped by the user to power the rotation of the rotary grinder.

Moreover, it is contemplated that the nail guide opening on the housing could be modified in a wide variety of suitable ways to improve functionality of the filing process. By way of example, without limitation, the opening on the housing may be configured for the "free form" applications, in which the opening is can be 1, suitably sized or shaped (e.g., including, without limitation, oval and triangular shapes) in various ways to best accommodate the nail based on the anatomical shape of the nail and/or 2, to facilitate the user in the ease and efficiency of user operation. Similarly, in some embodiments, the "holding point" of the present device is suitable shaped with useful angles and depth to assist in functionality of fixing the nail in place while filing. Some embodiments of the present invention, include one or more nail-guide openings, which, for example, without limitation, could be attach (e.g. using a quick snap) to the housing without requiring housing removal.

Figure 4B:
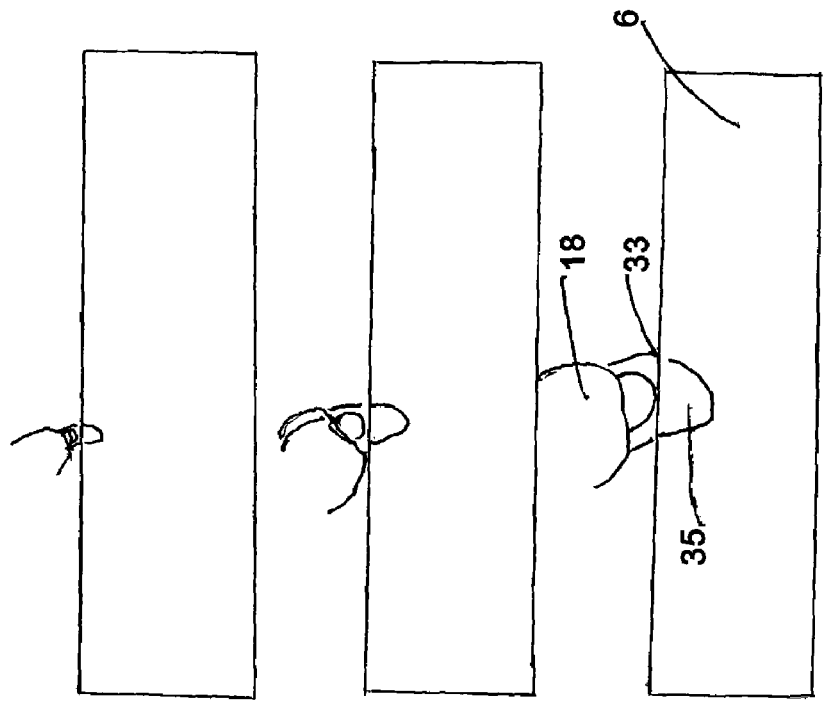
FIG. 4a, b illustrate a top view of various exemplary interchangeable housings and a side cut-away view of use thereof (at the top of the figure), in accordance with an embodiment of the present invention.
Figure 4A:
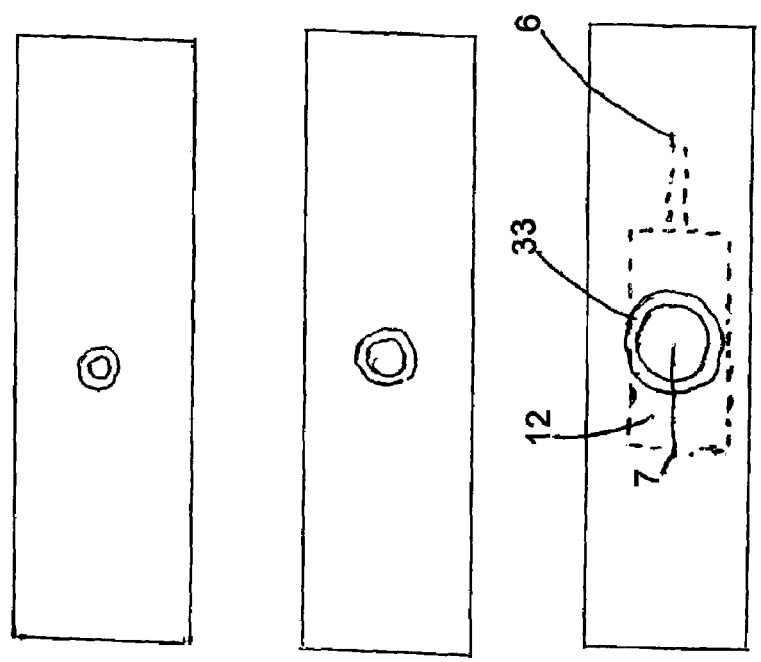

FIG. 4*a, b* illustrate a top view of various exemplary interchangeable housings and a side cut-away view of use thereof (at the top of the figure), in accordance with an embodiment of the present invention. The exemplary interchangeable housings 6 shown preferably have the same connective method with the rotary tool 20 but allow different points of contact between the nail 18 and rotary bit 12. In the present embodiment, multiple sizes of interchangeable housing 6 with different nail guide openings 46 ensure that the operator can see the sensitive nerve area in nail 18. By way of example, the operator can choose the appropriate size of housing 6 by removing housing 6 from rotary tool 20 and testing the depth that the animals nail 18 intrudes through nail guide opening 46. The operator can determine the amount of unwanted nail enamel 35 that will be removed from nail 18 by looking through housing 6. This observation assures the operator that only a predetermined length of nail enamel 35 will be removed from nail 18. Nail guide opening 46 has a beveled edge 33 to assist in positioning and measuring the desired length of the nail.

Figure 5A:
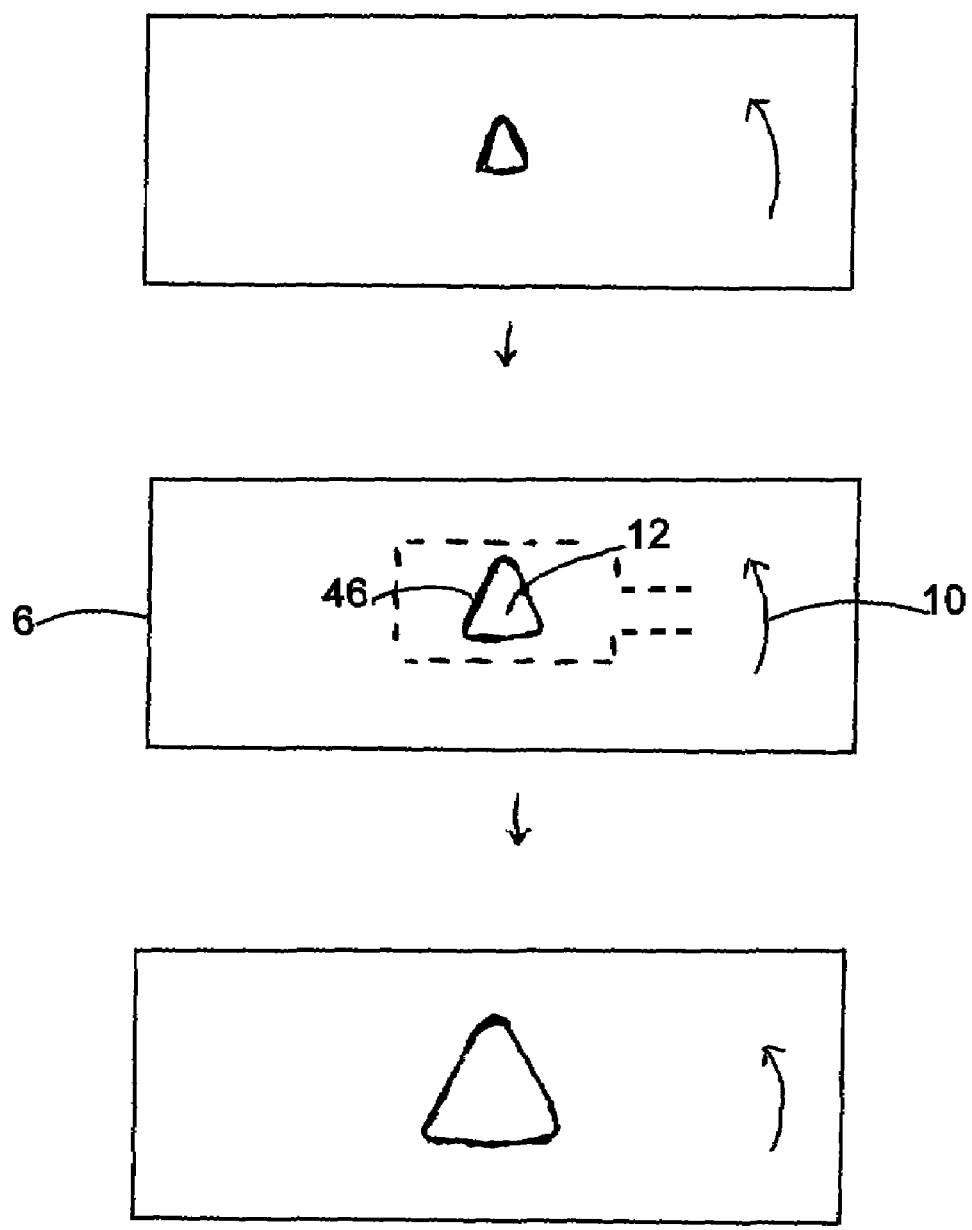
FIG. 5A illustrates a top view of exemplary housings with different sized contact points, in accordance with an embodiment of the present invention.

FIG. 5A illustrates a top view of exemplary housings with different sized contact points, in accordance with an embodiment of the present invention. As shown in the figure, alternate types of housings 6 are possible that have different sizes of nail guide openings 46 to accommodate different sizes of animal nails for "free form" procedure. The constant direction 10 of rotary bit 12 forces nail 18 into the apex of nail guide opening 46 and provides correct alignment with rotary bit 12.

Figure 5B:
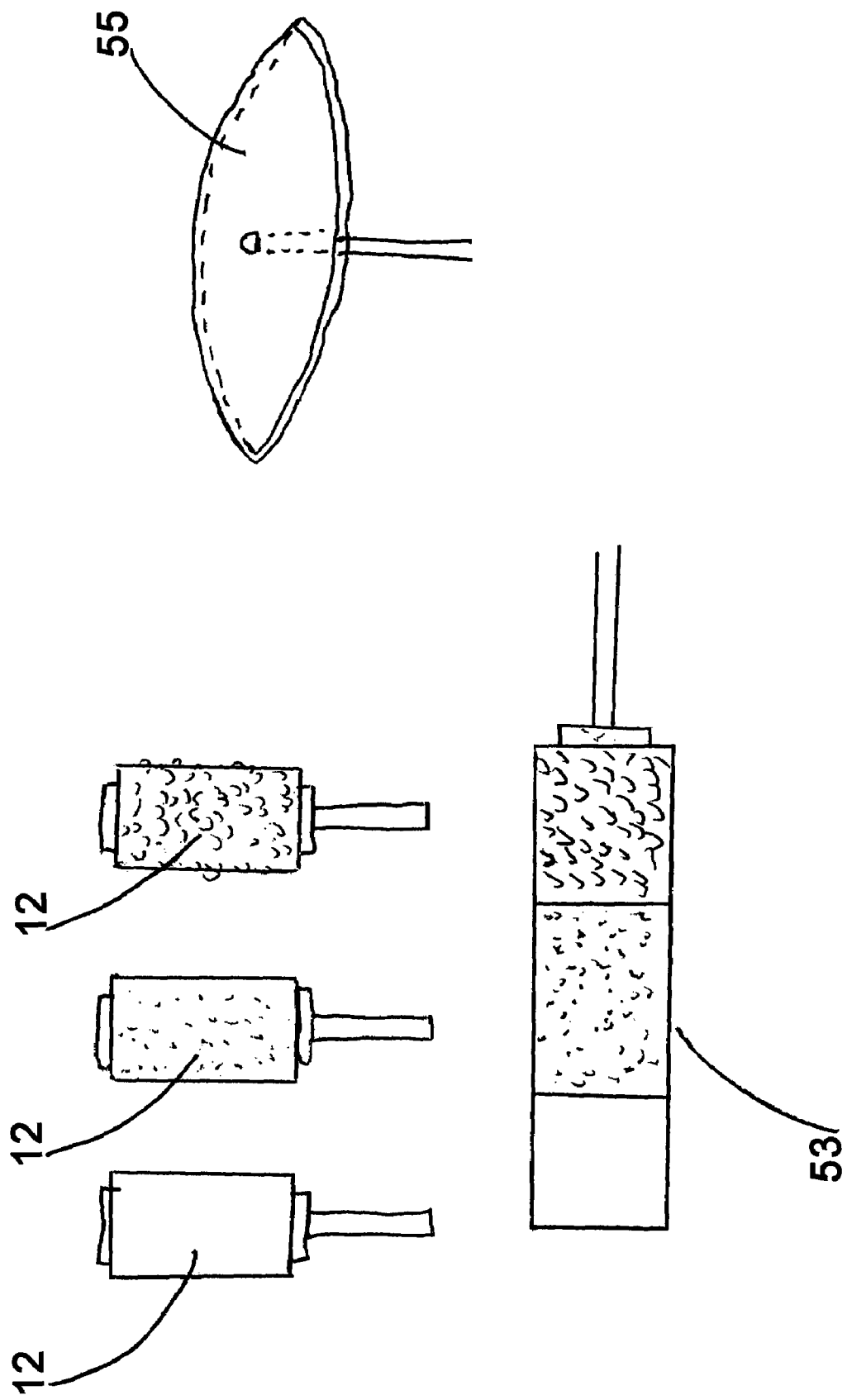
FIG. 5B illustrates a side view of various exemplary types of rotary grinding wheels, in accordance with an embodiment of the present invention.

FIG. 5B illustrates a side view of various exemplary types of rotary grinding wheels, in accordance with an embodiment of the present invention. As shown in the figure, different grades of rotary bits 12 may vary, for example, from very course to buff grade. Alternate housings 6 and rotary bits 12 allow for easy interchangeability of parts to accommodate different animals and provide greater flexibility for the animal handler.

In alternate embodiments, the rotary grinding bits could be made to have different shapes to accommodate different shape nails or to produce different results. They could be made of different materials that reduce friction, are relatively poor heat conductors, and/or are more durable to extend the life of the bit. In other embodiments, the bit itself could be shaped differently for various shaping advancements and perceived effectiveness. For example, without limitation, the bit could be replaced with a multipurpose device that may include a tool to cauterize injured nails.

Figure 6A:
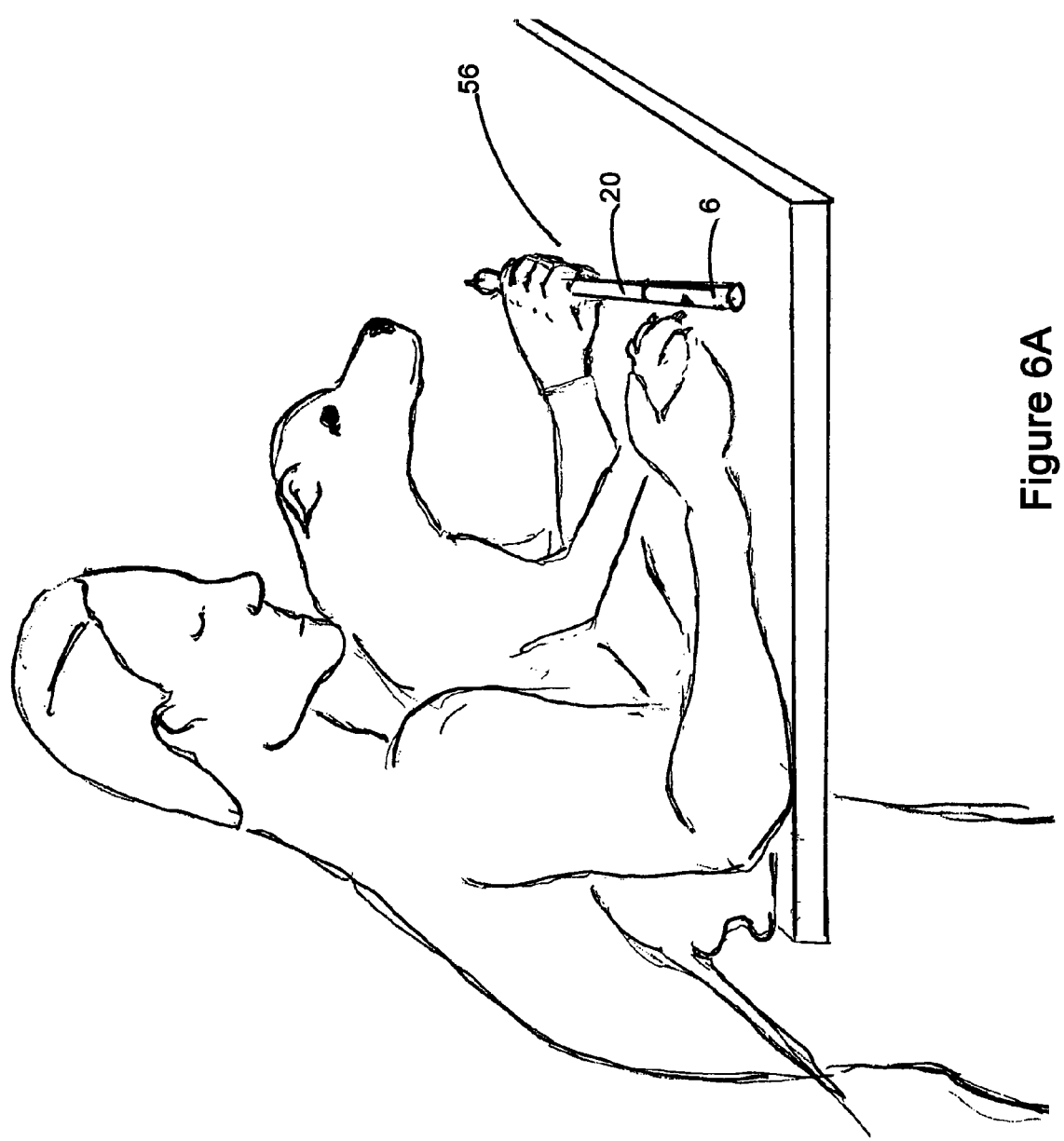
FIG. 6a, b, and c illustrate three different exemplary methods of handling an animal while using an embodiment of the present embodiment.
Figure 6B:
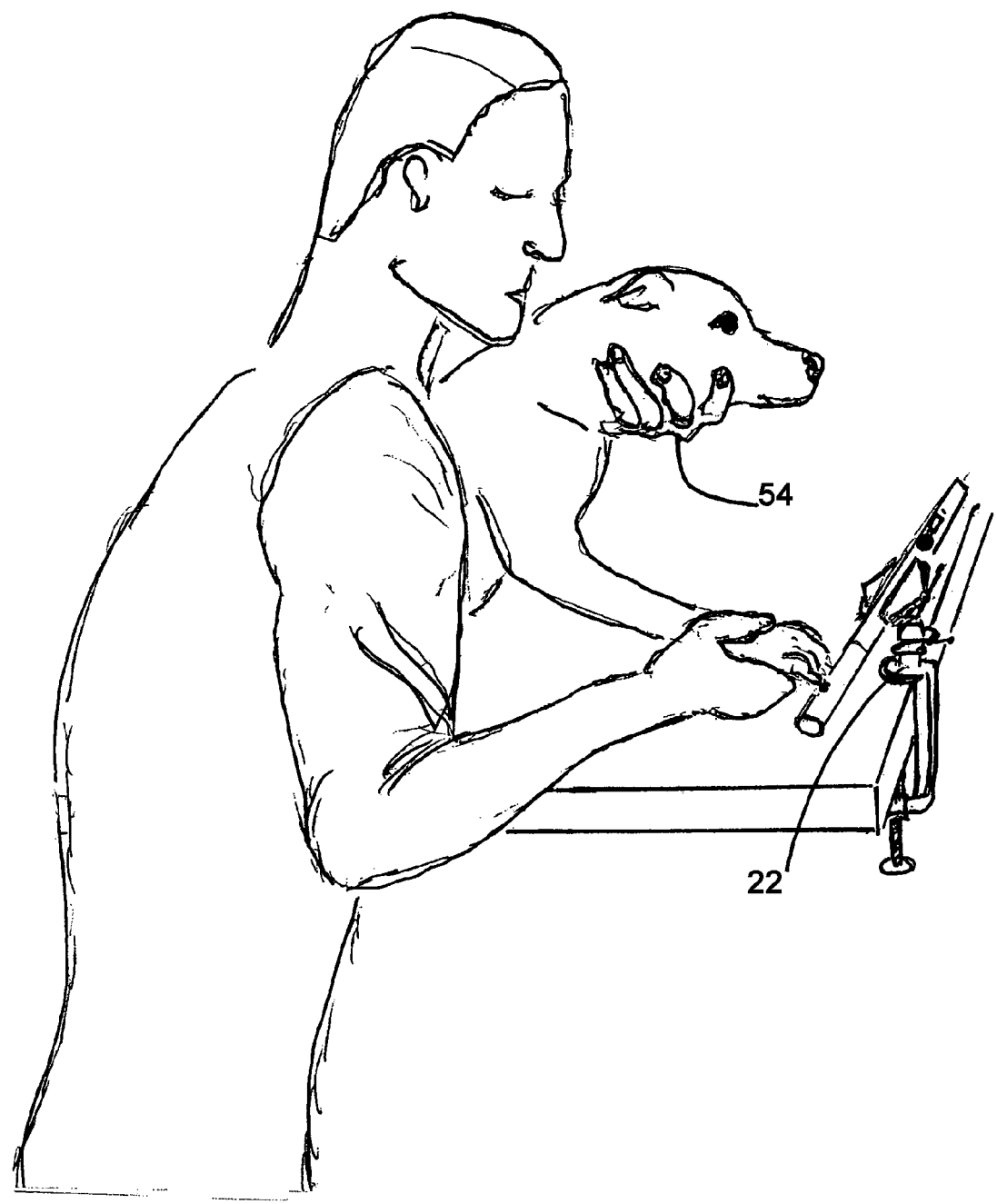
Figure 6C:

FIG. 6a, b, and c illustrate three different exemplary methods of handling an animal while using an embodiment of the present embodiment. As shown in the figure, a hand-held version of rotary tool 20 is used by the handler under various postures to control the animal during the nail filing procedure. FIG. 6A demonstrates one controlling method 56 where the handler stands behind the animal and uses one hand to hold rotary tool 20 and the other hand to hold the animal's paw. FIG. 6B illustrates another advanced control method 54 of holding an animal while using rotary tool 20 secured to a bench or flat surface with clamping device 22. FIG. 6C illustrates yet another method of animal control 58 where the animal's eyes are covered to protect the animal from becoming anxious. The hand-held option allows the trainer to engage the animal in a variety of ways and gives the handler better control while performing the nail filing procedure.

Figure 7:
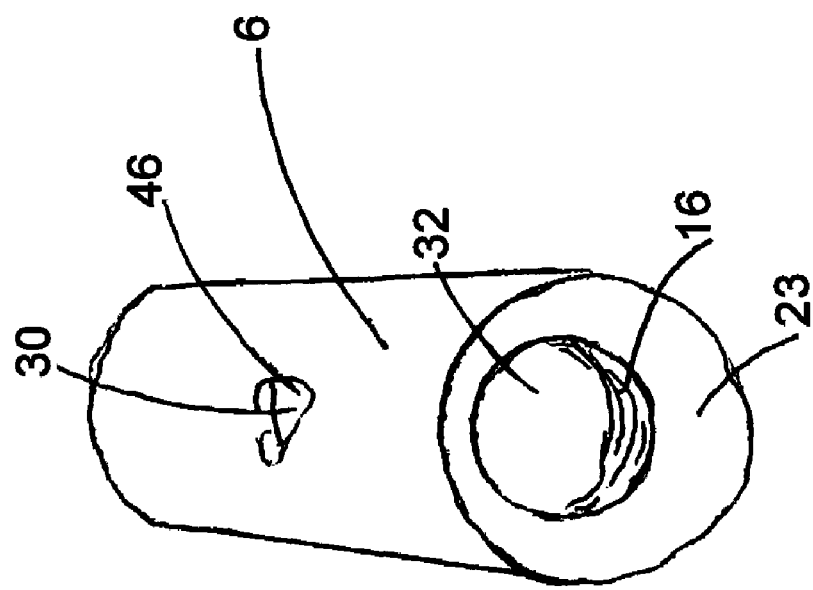
FIG. 7 illustrates, by way of example, a rear perspective view of the housing offset with the housing separated from the rotary tool, in accordance with an embodiment of the present invention.

FIG. 7 illustrates, by way of example, a rear perspective view of the housing offset with the housing separated from the rotary tool, in accordance with an embodiment of the present invention. As mentioned above, housing 6 with offset member 23 allows proper spacing so rotary bit 12 remains in a correct relationship with the animal's nail at contact point 30. Conjunction point 32 is the insertion point for rotary bit 12. Housing 6 connects to rotary tool 20 by way of threads 16.

Alternate embodiments of the present invention are contemplated where the housing has different physical shapes to accept, for example and without limitation, a bit that rotates at different angles than previously described or that has a different shaped bit such as, without limitation, a horizontally rotating bit that is flat. Yet other, alternate embodiments are contemplated that have restraining devices incorporated into the housing or separate from the housing that assist the handler in holding the animal's paw or arm during the filing process. In yet other embodiments, the means in which the housing is attached to the rotary tool could be designed with different coupling methods such as a snap on, clip on or locking device that would simplify the act of changing housings. It is further contemplated that the connection means between the housing and the rotary tool could also be made with a multiplicity of alternative shapes suitable to accommodate future advancements in functionality.

Figure 8:
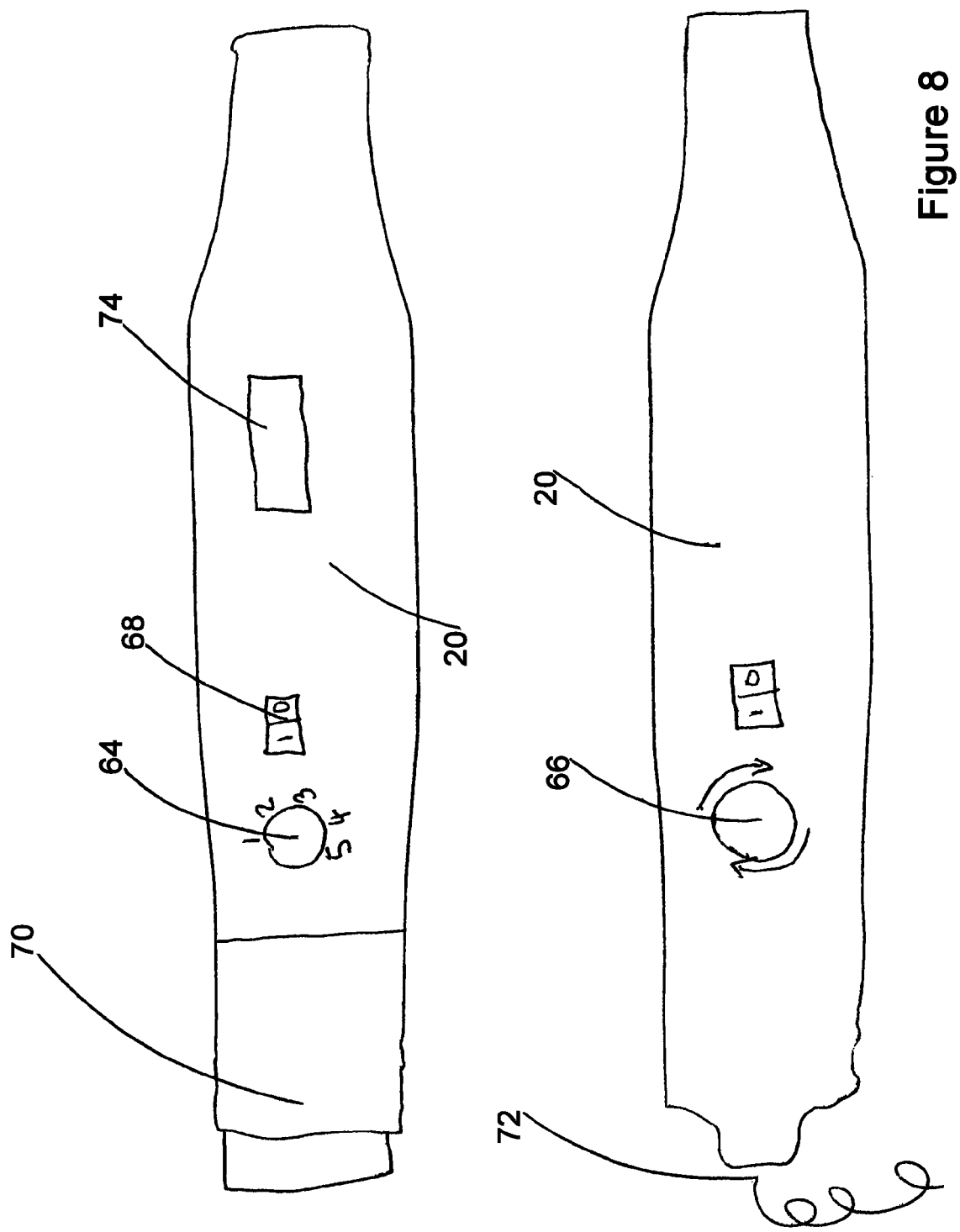
FIG. 8 illustrates some exemplary packaging embodiments of the present invention.

FIG. 8 illustrates some exemplary packaging embodiments of the present invention. In the Figure, two exemplary styles of rotary tool 20 with enhanced functionality are shown. Rotary tool 20 may be powered by Alternating Current (AC) 70 or Direct Current (DC) 72. Battery operation gives rotary tool 20 many portable advantages including the ability to be used indoors or outdoors. Options, such as a variable transformer with an incremental adjustment 64 or a gradual adjustment 66 can be added to increase or decrease the speed of rotary bit 12. An on/off switch 68 may be provided and configured as needed. The interchangeable rotary tool may also be equipped with a sensor 74 that may sense rigidity or flexibility of nail 18 or sensor 74 may sense the presence of blood and automatically turn off the tool.

It should be appreciated that embodiments of the present invention may also be shaped into any suitable form for the particular application; by way of example, and not limitation, to achieve ergonomic comfort, enhanced functionality or more pleasing aesthetics. As more advanced sensors come available, it is contemplated that the capabilities of the rotary tool could be enhanced with newer technology such as, without limitation, sensors that help judge the length of enamel removed or hemoglobin sensors to signal presence of blood. The present invention could be modified to have its own mounting device so it could be attached directly to a fixed surface. It could also have a restraining device coupled to the tool that holds the animal during the filing process. In alternate embodiments, the rotary tool could be designed without a rotary bit but instead using a different method of nail filing such as a sanding belt or angle grinder with a protective guard. In yet other embodiments, the angle of the grinding wheel and position of the rotary housing could he be made adjustable so that the bit could rotate horizontally or at graduated angles with respect to the handle of the tool.

Figure 9:
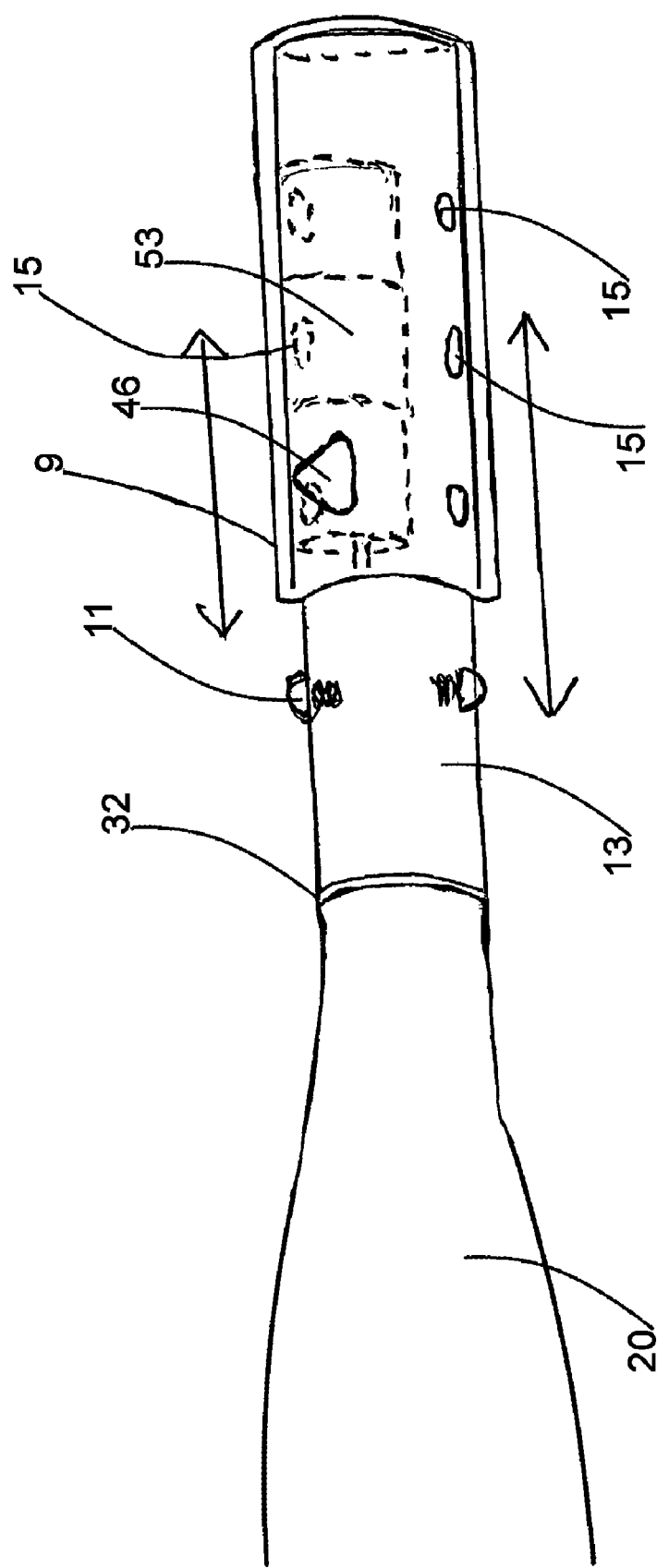
FIG. 9 illustrates a side elevation view of an exemplary rotary nail filing apparatus with an adjustable housing, in accordance with an embodiment of the present invention.

FIG. 9 illustrates a side elevation view of an exemplary rotary nail filing apparatus with an adjustable housing, in accordance with an embodiment of the present invention. Shown in the Figure is an exemplary adjustable housing 9 that moves the contact point 30 over the grinding stone 53 that has different grades of grit ranging from course to buff on the same stone. This is accomplished by having a connective piece 13 that conjoins the housing 9 to the rotary tool 20. The connective piece may have "male" a locking or snapping devise 11 that has depress able knobs. The housing 9 slides laterally over the connection piece 13 until the desired position "female" 15 is chosen on the housing 9. The contact point 30 would then be positioned over the desired grade on grinding bit 53 for the user. One aspect of the present design is that it improves user convenience and nail filing performance. In applications where the grinding bit has only one surface grind grade, this axial adjustability may be useful to enable the user to adjust the bit to use a less worn portion of the bit's grinding surface. It should be appreciated that the connection piece and its relationship to the housing is not limited to this arrangement. For example, without limitation, it could snap, screw or have any suitable mechanical variation. The housings 9 contact point may have both free form 30 and predetermined length 7 contact points.

Figure 10:
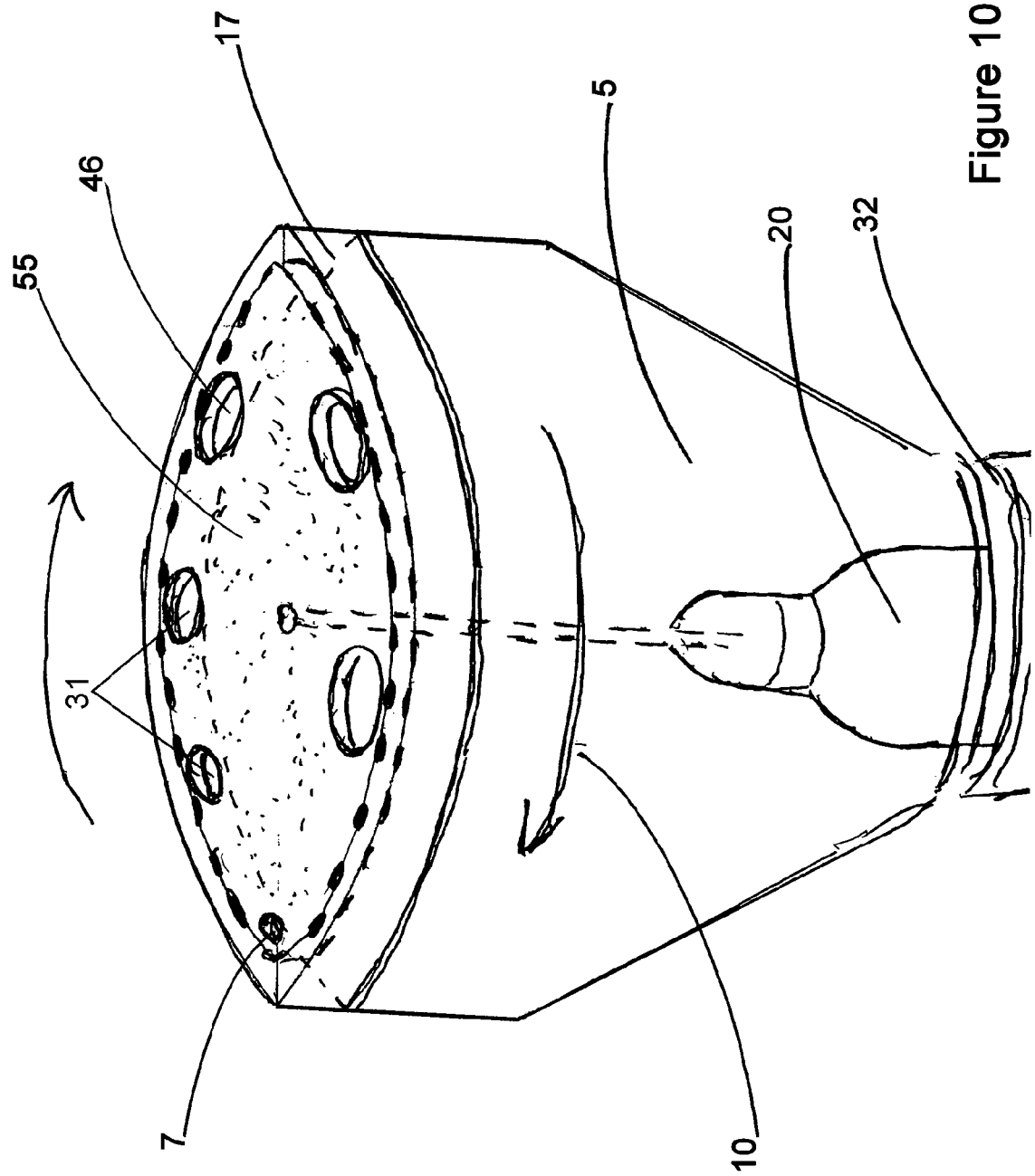
FIG. 10 illustrates a side elevation view of an exemplary rotary nail filing apparatus with an adjustable housing, in accordance with an alternative embodiment of the present invention.

FIG. 10 illustrates a side elevation view of an exemplary rotary nail filing apparatus with an adjustable housing, in accordance with an alternative embodiment of the present invention. Shown in the Figure is an arrangement in which the flat grinding wheels 55 relationship to the housing 5 is vertical. The housing is provided with a removable tray 17 via screwing or snapping that has variable size contact points 31 over the vertically powered grinding wheel 55. The housing 5 is connected 32 to the rotary tool 20 by any suitable means, such as, without limitation, snapping, screwing, or mechanical connective function. The devise shown works similar to the devices shown in prior Figures by placing the animals nail in the correct size contact point and so forth. The tray which has the contact points 17 may have both free form 30 and predetermined length 7 contact points.

Figure 11:
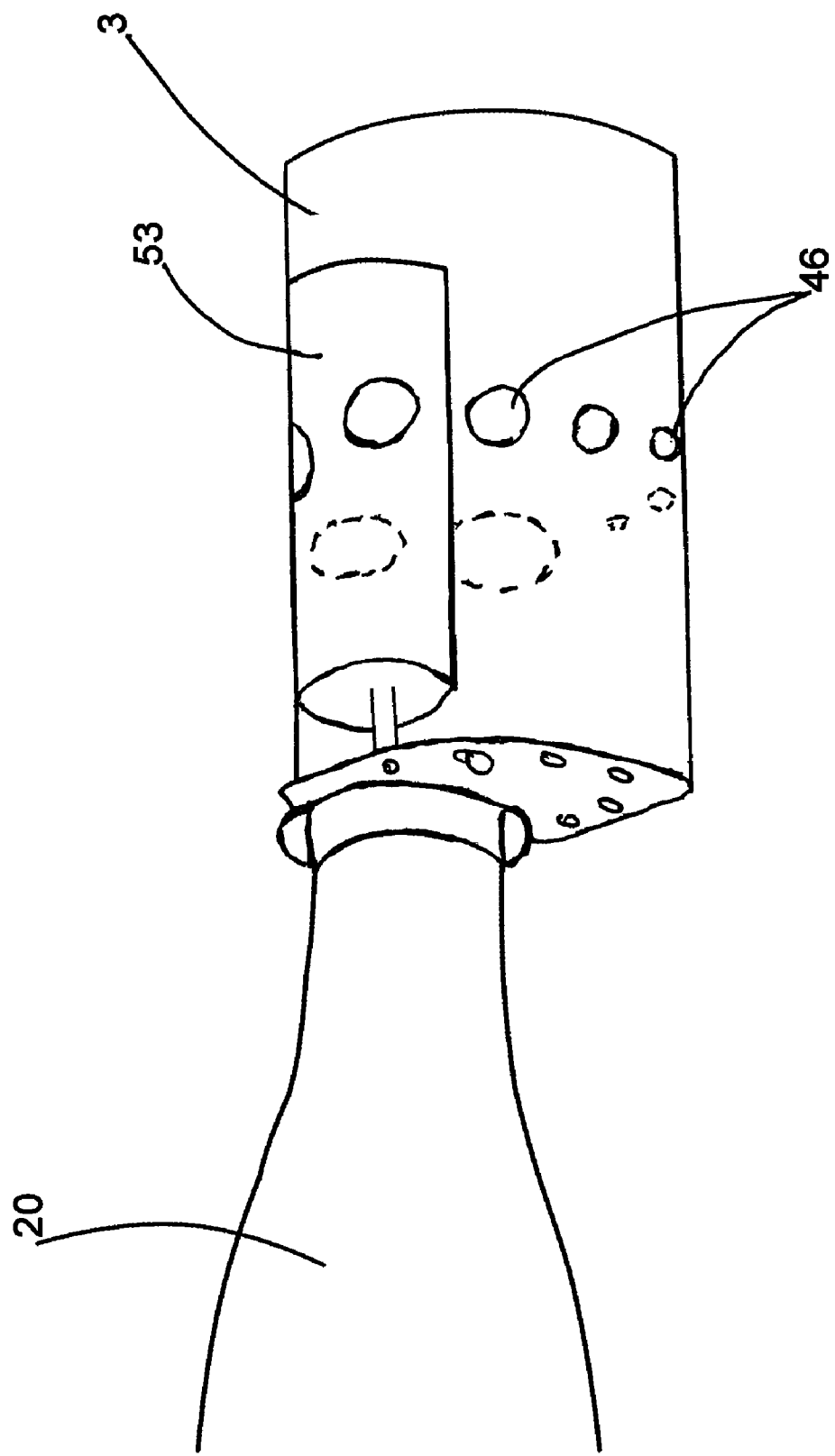
FIG. 11 illustrates a side elevation view of an exemplary rotary nail filing apparatus with an adjustable housing, in accordance with an alternative embodiment of the present invention.

FIG. 11 illustrates a side elevation view of an exemplary rotary nail filing apparatus with an adjustable housing, in accordance with an alternative embodiment of the present invention. Shown in the Figure is a housing 3 that mechanically revolves around the grinding bit 12 or 53 (not shown, see FIG. 9) to quickly find the appropriate contact point 30. Some embodiments may also combine the sliding mechanics of prior embodiment for convenient choice of course, medium to buff.

Figure 12:
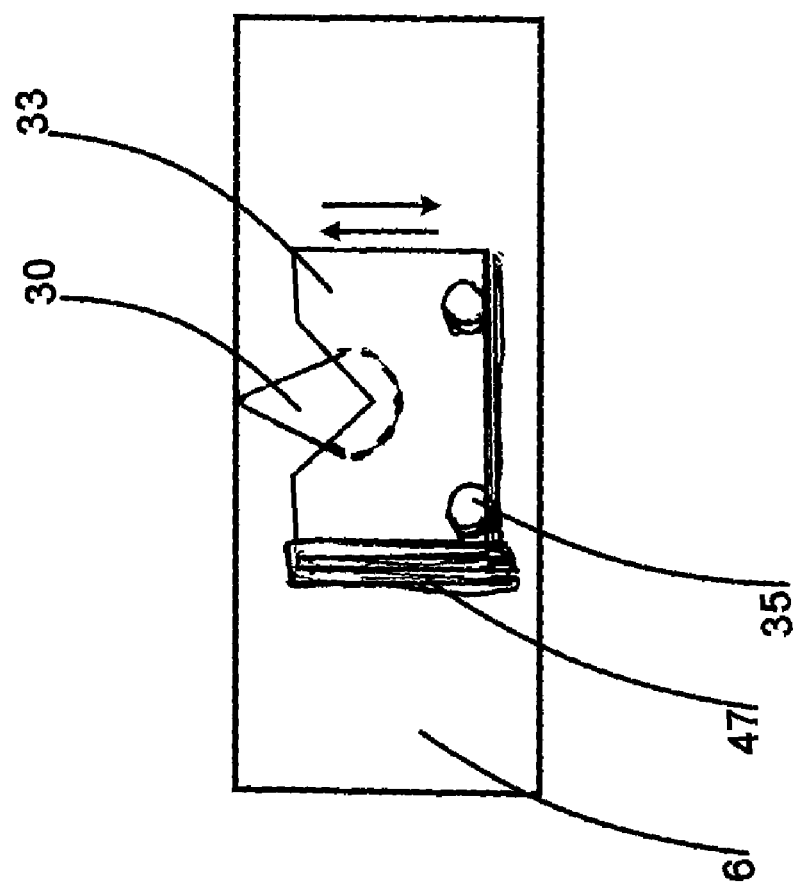
FIG. 12 illustrates a side elevation view of an exemplary adjustable opening, in accordance with an alternative embodiment of the present invention.

FIG. 12 illustrates a side elevation view of an exemplary adjustable opening, in accordance with an alternative embodiment of the present invention. A contact opening 30 is configure to enable the user to adjust the size of to an exact value on a housing 6. An adjustable leaf 33 is configured to slide up and down on tracks 47 until desired position is chosen. Leaf 33 is then fixed in place by the locking nuts 35, which may use screws or any fastening devise.

Having fully described at least one embodiment of the present invention, other equivalent or alternative methods of implementing a rotary nail file for animals according to the present invention will be apparent to those skilled in the art. The invention has been described above by way of illustration, and the specific embodiments disclosed are not intended to limit the invention to the particular forms disclosed. The invention is thus to cover all modifications, equivalents, and alternatives falling within the spirit and scope of the following claims.

What is claimed is:

1. A rotary nail filing apparatus for animals, the apparatus comprising:
   a shroud having a longitudinal axis;
   at least one internal space operable for receiving and containing nail filing debris;
   at least one shroud opening disposed circumferentially from said longitudinal axis, said at least one opening being operable for an end portion of a suitable animal's nail to be put through said at least one opening, said at least one opening comprising a first component of an effective holding point system for said suitable animal's nail;
   a rotary grinder contained within said shroud, the rotary grinder having a rotational axis that is generally parallel to said shroud axis and a grinding surface that is generally parallel to said rotational axis, said first holding point system component being a boundary portion of said at least one opening, said boundary portion having an apex, said boundary portion generally converges towards said apex from the left and right sides of said at least one opening, the rotary grinder being located such that at least a portion of the grinding surface is generally under at least a portion of said first holding point system component, the rotary grinder aligned to rotate generally towards said apex of said first holding point system component; said boundary portion having a thin semicircular edge opposite said apex, said apex is the distal most point of said at least one opening from the rotary grinder; the rotary grinder being further configured to provide a sufficiently small distance between said first holding point system component and at least a portion of the rotary grinder grinding surface to enable an end portion of the suitable animal's nail, when put though said at least one opening, to contact the grinding surface of the rotary grinder at a grinding contact location and achieve a suitable nail filing relationship with the suitable animal's nail at said grinding contact location, said rotary grinder being further configured to provide a sufficient gap between said grinding contact location and any obstructing structure to allow a substantial portion of the nail debris grinded away at said grinding contact location to be transported to and contained within said at least one debris containment space, said grinding contact location being a second component of said effective holding point system, said second holding point system component operating to frictionally grab the suitable animal's nail end portion and, as the rotary grinder rotates, pull the suitable animal's nail generally towards said first holding point system component, said first holding point system component thereby operating in cooperation with said second holding point system component to at least facilitate the convergence of the suitable animal's nail generally towards said apex, said converging shape of said first holding point system component further operating to likewise facilitate generally maintaining the suitable animal's nail terminally towards said apex and thereby enabling the holding point system to aid in holding the suitable animal's nail in a generally stable pivoting location that enables an operator of said rotary nail filing apparatus to three dimensionally file the suitable animal's nail end portion in a more controlled fashion.

\* \* \* \* \*